United States Patent [19]

McLaughlin et al.

[11] 4,257,995

[45] Mar. 24, 1981

[54] PROCESS FOR PREPARING PARTICLE BOARD AND POLYISOCYANATE-PHOSPHORUS COMPOUND RELEASE AGENT COMPOSITION THEREFOR

[75] Inventors: Alexander McLaughlin, Meriden; Reinhard H. Richter, North Haven, both of Conn.; Harold E. Reymore, Jr., Richmond, Va.

[73] Assignee: The Upjohn Company, Kalamazoo, Mich.

[21] Appl. No.: 134,315

[22] Filed: Mar. 26, 1980

Related U.S. Application Data

[63] Continuation-in-part of Ser. No. 35,647, May 3, 1979, which is a continuation-in-part of Ser. No. 947,209, Sep. 29, 1978, abandoned.

[51] Int. Cl.$^3$ .................. B29J 5/02; C08G 18/28; C08L 1/02
[52] U.S. Cl. .................... 264/122; 252/182; 260/9; 264/109; 528/51; 528/72; 528/75
[58] Field of Search ............................ 260/9

[56] References Cited

U.S. PATENT DOCUMENTS

| | | | |
|---|---|---|---|
| 3,870,665 | 3/1975 | Diehr et al. | 260/17.2 |
| 3,919,017 | 11/1975 | Shoemaker et al. | 156/62.2 |
| 3,943,075 | 3/1976 | Fishbein et al. | 528/51 |
| 4,005,034 | 1/1977 | Weil | 528/51 |
| 4,024,088 | 5/1977 | Godlewski | 528/51 |
| 4,100,328 | 7/1978 | Gallagher | 264/122 |

*Primary Examiner*—Edward M. Woodberry
*Attorney, Agent, or Firm*—Denis A. Firth; John Kekich

[57] ABSTRACT

The use of polyisocyanates as binders in the preparation of particle boards is subject to the drawback that the boards exhibit a tendency to adhere to the face of the platens used in their formation. This problem is minimized by incorporating minor amounts of a mixture of certain mono- and di- (saturated or unsaturated aliphatic) acid phosphates or the corresponding pyrophosphates, into the polyisocyanate to be used as binder. The polyisocyanates and the acid phosphates and or pyrophosphates, are applied to the particles separately, or after preblending one with the other. Whether the components are applied separately or in combination one with the other, they can each be applied either neat or in the form of an emulsion or emulsions.

43 Claims, No Drawings

PROCESS FOR PREPARING PARTICLE BOARD AND POLYISOCYANATE-PHOSPHORUS COMPOUND RELEASE AGENT COMPOSITION THEREFOR

CROSS-REFERENCE TO RELATED APPLICATION

This application is a continuation-in-part of copending application Ser. No. 35,647 filed May 3, 1979, which latter is a continuation-in-part of application Ser. No. 947,209 filed Sept. 29, 1978, now abandoned.

BACKGROUND OF THE INVENTION

1. Field of the Invention

This invention relates to particle board binders and is more particularly concerned with the use of organic polyisocyanates as particle board binders, with compositions for said use, and with the particle boards so prepared.

2. Description of the Prior Art

The use is now widely recognized of organic polyisocyanates, particularly toluene diisocyanate, methylenebis(phenyl isocyanate), and polymethylene polyphenyl polyisocyanates, as binders, or as a component or a binder, for the preparation of particle boards; see, for example, U.S. Pat. Nos. 3,428,592; 3,440,189; 3,557,263; 3,636,199; 3,870,665; 3,919,017 and 3,930,110.

In a typical process the binder resins, optionally in the form of a solution or aqueous suspension or emulsion, are applied to or admixed with the particles of cellulosic material, or other types of material capable of forming particle boards, using a tumbler apparatus or blender or other form of agitator. The mixture of particles and binder is then formed into a mat and subjected to heat and pressure using heated platens. The process can be carried out in a batch operation or continuously. To avoid adhesion of the board so formed to the heated platens it has hitherto been necessary to interpose a sheet, impermeable to isocyanate, between the surface of the board and the platen during the forming process, or to coat the surface of the platen, prior to each molding operation, with an appropriate release agent or to coat the surface of the particles themselves with a material which will not adhere to the platen. Any of these alternatives, particularly where the process is being operated on a continuous basis, is cumbersome and a drawback to what is otherwise a very satisfactory method of making a particle board with highly attractive structural strength properties.

We have now found that the above drawbacks to the use of organic isocyanates as particle board binders can be minimized in a very satisfactory manner by incorporating certain phosphorus-containing compounds as internal release agents in the isocyanate compositions so utilized. We are aware of U.S. Pat. No. 4,024,088 which describes the incorporation of phosphorus-containing compounds as internal release agents in the preparation of polyether polyurethanes.

SUMMARY OF THE INVENTION

This invention comprises an improved process for the preparation of particle board in which particles of organic material capable of being compacted are contacted with a polyisocyanate and the treated particles are subsequently formed into boards by the application of heat and pressure, wherein the improvement comprises contacting said particles, in addition to the treatment with polyisocyanate, with from about 0.1 to 20 parts, per 100 parts by weight of polyisocyanate, of a phosphate selected from the class consisting of (a) acid phosphates of the formulae

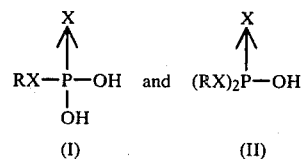

and the ammonium, alkali metal, alkaline earth metal and amine salts thereof;

(b) pyrophosphates represented by those derived from the acid phosphates (I) and (II) and mixtures of (I) and (II);

(c) The O-monoacyl derivatives of the acid phosphates (I) and (II) having the formulae

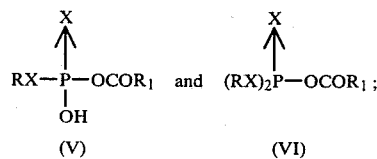

(d) carbamoyl phosphates having the formulae

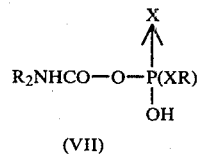

and the ammonium, alkali metal, alkaline earth metal and amine salts of the compounds of formula (VII);

(e) branched polyphosphates of the formulae

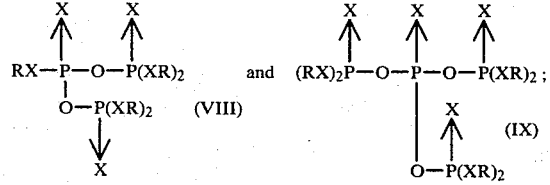

(f) polyphosphates corresponding to the general formula

including the cyclometaphosphates (n=3); and (g) mixtures of two or more of said compounds;

wherein, in the various formulae shown above, each R is independently selected from the class consisting of alkyl having at least 3 carbon atoms, alkenyl having at least 3 carbon atoms, aryl, aryl substituted by at least one alkyl, alkyl substituted by from 1 to 2 acyloxy groups wherein the acyl group is the residue of an aliphatic monocarboxylic acid having at least 2 carbon atoms, and

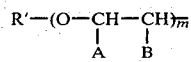

wherein R' is selected from the class consisting of alkyl, aryl and aryl substituted by at least one alkyl, one of A and B represents hydrogen and the other is selected from the class consisting of hydrogen, methyl, chloromethyl and 2,2,2-trichloromethyl, and m is a number having an average value from 1 to 25; provided that, when one of the R's informulae (II), (VI), (VIII) and (IX) is alkyl having at least 3 carbon atoms, the other R can also be selected from methyl and ethyl; and further provided that, in formula (II), the two RX groups taken together with the P atom to which they are attached can additionally form the residue of a heterocyclic nucleus having from 5 to 6 ring atoms; $R_1$ is hydrocarbyl; $R_2$ is selected from the class consisting of hydrocarbyl and hydrocarbyl substituted by at least one additional

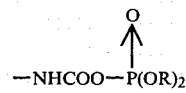

group wherein R has the significance defined above; n is an integer; and X in each instance is a chalcogen selected from oxygen and sulfur.

The invention also comprises novel compositions comprising organic polyisocyanates having incorporated therein one or more of the aforesaid compounds. The invention also comprises particle board prepared in accordance with the aforesaid process.

The term "alkyl having at least 3 carbon atoms" means a saturated monovalent aliphatic radical, straight chain or branched chain, which has the stated minimum number of carbon atoms in the molecule. Illustrative of such groups are propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, pentacosyl, hexacosyl, heptacosyl, octacosyl, nonacosyl, triacontyl, pentatriacontyl, and the like, including isomeric forms thereof.

The term "alkenyl having at least 3 carbon atoms" means a monovalent straight or branched chain aliphatic radical containing at least one double bond, and having the stated minimum number of carbon atoms in the molecule. Illustrative of such groups are allyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, pentacosenyl, triacontenyl, pentatriacontenyl, and the like, including isomeric forms thereof.

The term "aryl" means the monovalent radical obtained by removing one nuclear hydrogen atom from an aromatic hydrocarbon. Illustrative of aryl are phenyl, naphthyl, biphenylyl, triphenylyl and the like. The term "aryl substituted by at least one alkyl" means an aryl radical, as above defined, carrying at least one alkyl (as above defined) substituent. Illustrative of such are tolyl, xylyl, butylphenyl, octylphenyl, nonylphenyl, decylphenyl, decyltolyl, octadecylphenyl, and the like.

The term "residue of a heterocyclic nucleus having from 5 to 6 ring atoms" which can be represented by the two RX taken together with the P atom to which they are attached as shown in Formula (II) means the group of the formula

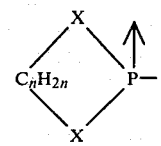

wherein X is as above defined and $C_nH_{2n}$ is alkylene having 2 to 3 carbon atoms in the chain and having a total of 18 carbon atoms in the radical. Illustrative of alkylene are ethylene, 1,3-propylene, 1,2-butylene, 1,2-hexylene, 2-methyl-1,3-octylene, 2,5-diethyl-1,3-hexylene, 2,4-dihexyl-1,3-pentylene, and the like.

The term "pyrophosphates - - - derived from the acid phosphates (I) and (II) and mixtures of (I) and (II)" has the following meaning. The acid phosphates (I) and (II) are generally prepared in the form of mixtures of the monoacid phosphates (II) and the diacid phosphate (I) which mixtures are produced by reaction of the corresponding alcohol ROH or thiol RSH, wherein R is as above defined, with phosphorus pentoxide or oxysulfide in accordance with procedures well-known in the art for the preparation of acid phosphates; see, for example, Kosolapoff, Organophosphorus Compounds, pp 220–221, John Wiley and Sons, Inc., New York, 1950. The mixture of the mono- and di-acid phosphates so obtained can be separated, if desired, for example by fractional crystallization of the barium and like salts as described in the above cited reference. The individual acid phosphates or mixtures of the two can be used in the process of the invention. The pyrophosphates (III) and (IV) are readily obtained from the corresponding acid phosphates (II) and (I) respectively, by reaction of the latter with a dehydrating agent such as carbonyl chloride, aryl or alkyl monoisocyanates and polyisocyanates, N,N'-dihydrocarbylcarbodiimides, and the like in accordance with procedures well-known in the art; see, for example, F. Cramer and M. Winter, Chem. Ber. 94, 989 (1961); ibid 92, 2761 (1959); M. Smith, J. G. Moffat and H. G. Khorana, J. Amer. Chem. Soc. 80, 6204 (1958); F. Ramirez, J. F. Marecek and I. Ugi, JACS 97, 3809 (1975). The individual acid phosphates (I) and (II) can be separately converted to the corresponding pyrophosphates or mixtures of the two types of acid phosphate (I) and (II) can be converted to the corresponding mixture of pyrophosphates.

In the case of the acid phosphates having the formula (II) above the corresponding pyrophosphates are those represented by the formula:

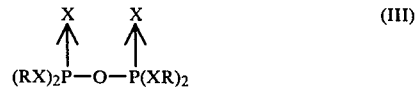
(III)

wherein R and X have the meaning hereinbefore defined. In the case of the acid phosphates having the formula (I) above the corresponding pyrophosphates are a complex mixture whose average composition is represented by the formula:

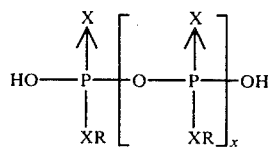

(IV)

wherein x is a number having an average value of 1 or higher and R and X have the meaning hereinbefore defined.

The term "hydrocarbyl" means the monovalent radical obtained by removing one hydrogen atom from the parent hydrocarbon. Illustrative of such groups are alkyl and alkenyl, both as hereinbefore defined; aralkyl such as benzyl, phenylpropyl, phenethyl, naphthylmethyl, phenyldodecyl, and the like; aryl and aryl substituted by alkyl, both as hereinbefore defined; cycloalkyl such as cyclobutyl, cyclopentyl, cyclohexyl, cycloheptyl, cyclooctyl, and the like, including isomeric forms thereof; and cycloalkenyl such as cyclopentenyl, cyclohexenyl, cycloheptenyl, cyclooctenyl and the like including isomeric forms thereof.

Each of the groups R, R', $R_1$ and $R_2$ in the various formulae set forth above can optionally be substituted by one or more inert substituents, i.e. substituents which do not contain active hydrogen atoms and which are therefore unreactive in the presence of the polyisocyanate. Illustrative of such inert substituents are alkoxy, alkylmercapto, alkenyloxy, alkenylmercapto, chloro, bromo, iodo, fluoro, cyano and the like.

The term "alkali metal" has its well recognized meaning as being inclusive of lithium, sodium, potassium, rubidium and caesium. The term "alkaline earth metal" also has its well recognized meaning as being inclusive of calcium, strontium, magnesium and barium. The term "amine salts" means the salts of the acid phosphates in question with organic amines which latter are exemplified by monoalkylamines such as methylamine, ethylamine, isopropylamine, sec-butylamine, amylamine, hexylamine, isohexylamine, octylamine and the like; dialkylamines such as dimethylamine, N-ethyl-N-methylamine, N-methyl-N-propylamine, N-methyl-N-isobutylamine, diisopropylamine, N-ethyl-N-hexylamine, N-methyl-N-isooctylamine and the like; trialkylamines such as triethylamine, trimethylamine, N,N-dimethylpropylamine, N,N-dimethylhexylamine, N,N-diethylisobutylamine and the like; monoalkenylamines such as allylamine, 2-butenylamine, 3-hexenylamine, octenylamine and the like; dialkenylamines such as diallylamine, di-2-butenylamine, di-3-hexenylamine, and the like; cycloalkylamines such as cyclopropylamine, cyclobutylamine, cyclopentylamine, cyclohexylamine and the like; N-alkyl-cycloalkylamines such as N-methylcyclopentylamine, N-ethylcyclopentylamine, N-propylcyclohexylamine and the like; cycloalkenylamines such as cyclopentenylamine, cyclohexenylamine and the like; aralkylamines such as benzylamine, phenethylamine, phenylpropylamine, benzhydrylamine and the like; N-alkyl-N-aralkylamines such as N-methylbenzylamine, N-propylbenzylamine, N-isobutylbenzylamine, N-octylbenzylamine, N-methylphenethylamine and the like; N,N-disubstituted aralkylamines such as N,N-dimethylbenzylamine, N-methylbenzhydrylamine, N,N-diethyl-3-phenylpropylamine, N-butyl-2-phenethylamine and the like; N-alkyl-arylamines such as N-methylaniline, N-isopropyl aniline, N-hexylaniline, N-methyl-p-toluidine, N-ethyl-m-xylidine, N-methylnaphthylamine, N-methyl-benzidine, N,N'-dimethylbenzidine and the like; N,N-dialkylarylamines such as N,N-dimethylaniline, N,N-dibutylaniline, N-hexyl-N-methylaniline, N,N-dimethyltoluidine and the like; N-aralkyl-arylamines such as N-benzylaniline, N-phenethylaniline, N-benzhydrylaniline and the like; arylamines such as aniline, o-, m-, and p-toluidine, o-, m-, and p-xylidine, 1-naphthylamine, 2-naphthylamine and the like; alkanolamines such as ethanolamine, propanolamine, diethanolamine and the like; heterocyclic amines such as pyridine, quinoline, pyrrolidine, piperazine, morpholine, and alkyl-substituted pyrrolidines, piperidines, piperazines and morpholines, such as N-methylpyrrolidine, N-ethylpiperidine, N-methyl-N'-hexylpiperazine, N-methyl-morpholine and the like.

DETAILED DESCRIPTION OF THE INVENTION

The process of the invention is carried out substantially in accordance with methods previously described in the art in which an organic polyisocyanate is used as the binder resin, or a component thereof, (see, for example, German Offenlegungsschrift No. 2610552 and U.S. Pat. No. 3,428,592) with the chief exception that a phosphate as hereinbefore defined is employed in combination with the isocyanate composition which is used to treat the particles which are to be bonded together to form the particle board.

Thus, particle board is produced according to the invention by bonding together particles of wood or other cellulosic or organic or inorganic material capable or being compacted using heat and pressure in the presence of a binder system which comprises a combination of an organic polyisocyanate and a phosphate as hereinbefore defined, hereinafter referred to as the "phosphate release agent".

The polyisocyanate and the phosphate release agent can be brought into contact with the particles as separate, individual components or, in a preferred embodiment, the polyisocyanate and phosphate are brought into contact with the particles either simultaneously or after admixture. Whether the polyisocyanate and phosphate are introduced separately or in admixture, they can be employed neat, i.e. without diluents or solvents or one or other or both can be employed in the form of aqueous dispersions or emulsions.

The polyisocyanate component of the binder system can be any organic polyisocyanate which contains at least two isocyanate groups per molecule. Illustrative of organic polyisocyanates are diphenylmethane diisocyanate, m- and p-phenylene diisocyanates, chlorophenylene diisocyanate, α,α-xylylene diisocyanate, 2,4- and 2,6-toluene diisocyanate and the mixtures of these two isomers which are available commercially, triphenylmethane triisocyanates, 4,4'-diisocyanatodiphenyl ether, and polymethylene polyphenyl polyisocyanates. The latter polyisocyanates are mixtures containing from about 25 to about 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

The polymethylene polyphenyl polyisocyanates are the preferred polyisocyanates for use in the binder systems of the invention. Particularly preferred polymethylene polyphenyl polyisocyanates are those which contain from about 35 to about 65 percent by weight of methylenebis(phenyl isocyanate).

When the organic polyisocyanate is to be employed as binder system in the form of an aqueous emulsion or dispersion in accordance with the invention, the aqueous emulsion or dispersion can be prepared using any of the techniques known in the art for the preparation of aqueous emulsions or dispersions, prior to use of the composition as the binder. Illustratively, the polyisocyanate is dispersed in water in the presence of an emulsifying agent. The latter can be any of the emulsifying agents known in the art including anionic and nonionic agents. Illustrative of nonionic emulsifying agents are polyoxyethylene and polyoxypropylene alcohols and block copolymers of two or more of ethylene oxide, propylene oxide, butylene oxide, and styrene; alkoxylated alkylphenols such as nonylphenoxy poly(ethyleneoxy)ethanols; alkoxylated aliphatic alcohols such as ethoxylated and propoxylated aliphatic alcohols containing from about 4 to 18 carbon atoms; glycerides of saturated and unsaturated fatty acids such as stearic, oleic, and ricinoleic acids and the like; polyoxyalkylene esters of fatty acids such as stearic, lauric, oleic and like acids; fatty acid amides such as the dialkanolamides of fatty acids such as stearic, lauric, oleic and like acids. A detailed account of such materials is found in Encyclopedia of Chemical Technology, Second Edition, Vol. 19, pp. 531–554, 1969, Interscience Publishers, New York.

The formation of the emulsion or dispersion can be carried out at any time prior to its use as the binder composition, but, preferably, it is carried out within about 3 hours prior to use. Any of the methods conventional in the art for the preparation of aqueous emulsions can be employed in preparing the aqueous polyisocyanate emulsions employed in the process of the invention. Illustratively, the emulsion is formed by bringing the polyisocyanate, emulsifying agent and water together under pressure using a conventional spray gun in which the streams of water and polyisocyanate impinge and are mixed under turbulent conditions in the mixing chamber of the spray gun. The emulsion so formed is discharged in the form of a spray which is applied to the cellulosic particles to be formed into boardstock in the manner discussed below.

As discussed, above, the phosphate release agent can be brought into contact with the particles as a separate component in which case it is employed in neat form, i.e. without diluents, or as an aqueous solution or dispersion. Preferably the phosphate, either neat, or in diluted form when used alone i.e. separately from the polyisocyanate, is presented to the particles in the form of a spray. However, in a preferred embodiment of the invention the phosphate release agent and the polyisocyanate are employed together in a single composition. This can be accomplished in several ways. Thus, when the polyisocyanate is employed as binder resin without diluents such as water, the phosphate release agent can be incorporated in the polyisocyanate by simple admixture. Where the polyisocyanate is employed as binder resin in the form of an aqueous emulsion the phosphate release agent can be added as a separate component during the formation of the emulsion or after its formation or, in a particularly advantageous embodiment, the phosphate is premixed with the organic polyisocyanate prior to emulsification of the latter. Thus, the organic polyisocyanate and the phosphate release agent can be premixed and stored for any desired period prior to formation of the emulsion. Further, when an emulsifying agent is employed in preparation of the emulsion said agent can also be incorporated into the mixture or organic polyisocyanate and phosphate release agent to form a storage stable composition which can be converted, at any desired time, to an aqueous emulsion for use as a binder resin by simple admixture with water.

When the polyisocyanate is employed as binder in the form of an aqueous emulsion, the proportion of organic polyisocyanate present in the said aqueous emulsion is advantageously within the range of about 0.1 to about 99 percent by weight and preferably within the range of about 25 to about 75 percent by weight.

Whether the phosphate release agent is introduced as a separate component or in combination with the polyisocyanate, the proportion of phosphate release agent employed is within the range of about 0.1 to about 20 parts by weight, per 100 parts of polyisocyanate and, preferably, is within the range of about 2 to about 10 parts by weight, per 100 parts of polyisocyanate. The proportion of emulsifying agent required to prepare the aqueous emulsion is not critical and varies according to the particular emulsifying agent employed but is generally within the range of about 0.1 to about 20 percent by weight based on polyisocyanate.

The starting material for the particle board comprises particles of cellulosic and like material capable of being compacted and bonded into the form of boards. Typical such materials are wood particles derived from lumber manufacturing waste such as planar shavings, veneer chips, and the like. Particles of other cellulosic material such as shredded paper, pulp or vegetable fibres such as corn stalks, straw, bagasse and the like, and of non-cellulosic materials such as scrap polyurethane, polyisocyanurate and like polymer foams can also be used. Inorganic materials such as hydrated alumina, gypsum, chopped mineral fibres and the like can also be employed, either along or in combination with any of the above cellulosic or non-cellulosic materials, in the formation of particle boards in accordance with the present invention. If desired, mixtures of cellulosic particles may be used. Particle board has been successfully produced, for example, from wood particle mixtures containing up to about 30% bark.

The moisture content of the particles suitably may range from about 0 to about 24 percent by weight. Typically, particles made from lumber waste materials contain about 10–20% moisture, and may be used without first being dried.

Particle board is fabricated by spraying the particles with the components of the binder composition, either separately or in combination, while the particles are tumbled or agitated in a blender or like mixing apparatus. Illustratively, a total of about 2 to 8% by weight of the binder system (excluding any water present therein) is added, based on the "bone dry" weight of the particles, but higher or lower amounts of binder resin may be used in any given application. Illustratively, where the particles are of large size, such as in chipboard and wafer board, it is possible to use amounts of binder as low as 1% by weight or even less based on the "bone dry" weight of the particles. Where the particles are very small, i.e. have a high surface area to volume ratio as in the case of powdered inorganic materials, it is desirable to use amounts of binder as high as about 20 percent by weight or even higher. If desired, other materials, such as wax sizing agents, fire retardents, pigments and the like, may also be added to the particles during the blending step.

After blending sufficiently to produce a uniform mixture, the coated particles are formed into a loose mat or felt, preferably containing between about 4% and about 18% moisture by weight. The mat is then placed in a heated press between caul plates and compressed to consolidate the particles into a board. Pressing times, temperatures and pressures vary widely depending on the thickness of the board produced, the desired density of the board, the size of the particles used, and other factors well known in the art. By way of example, however, for ½" thick particle board of medium density, pressures of about 300 to 700 psi and temperatures of about 325°–375° F. are typical. Pressing times are typically about 2–5 minutes. Because a portion of the moisture present in the mat reacts with polyisocyanate to form polyurea, as described earlier, the level of moisture present in the mat is not as critical with isocyanate binders as with other binder systems.

The above-described process can be carried out on a batch basis, i.e. individual sheets of particle board can be molded by treating an appropriate amount of particles with the binder resin combination and heating and pressing the treated material. Alternatively, the process can be carried out in a continuous manner by feeding treated particles in the form of a continuous web or mat through a heating and pressing zone defined by upper and lower continuous steel belts to which, and through which, the necessary heat and pressure are applied.

Whether the process of the invention is carried out in a batchwise or continuous manner, it is found that the particle board produced using the polyisocyanate and phosphate release agent combination of the invention is released readily from the metal plates of the press used in its formation and shows no tendency to stick or adhere to said plates. This is in direct contrast to previous experience with the use of polyisocyanates alone as binder resins as discussed above.

While any of the phosphate release agents defined hereinbefore can be used, either alone or in combination, in the process of the invention, it is preferred to use the pyrophosphates (III) and (IV) or mixed pyrophosphates derived from mixtures of the acid phosphates (I) and (II). Thus, the free hydroxyl groups present in the pyrophosphates, or any free hydroxyl groups present in the form of unconverted acid phosphate starting material, are generally sufficiently hindered as to be unreactive at ambient temperatures with the polyisocyanate employed in the process of the invention and the pyrophosphates can be stored in combination with said polyisocyanate for prolonged periods without showing any evidence of deterioration. However, when the mixture of pyrophosphate and polyisocyanate is emulsified and employed in the process of the invention the processing temperature and the steam generated in the formation of the particle board are believed to result in hydrolysis of the pyrophosphate with regeneration of the corresponding acid phosphates which latter then serve to facilitate subsequent release of the particle board from the plates of the press. It is to be understood that the above theory is presented for purposes of explanation only and is not to be construed as limiting in any way the scope of the present invention.

As set forth above, the monoacid phosphates (II) and the di-acid phosphates (I), and the salts thereof, which are employed in the process of the invention are obtained by conventional procedures such as reaction of the corresponding alcohol or thiol RXH, wherein R and X are as hereinabove defined, with phosphorus pentoxide or phosphorus oxysulfide; Kosolapoff, ibid. As will be obvious to one skilled in the art, it is possible by using mixtures of two or more different alcohols or thiols in the above reaction to obtain a corresponding mixture of acid phosphates (I) and or (II) wherein the various components of the mixture have different values of the group R. As also set forth above the mixture of mono- and di-acid phosphates obtained in the above reaction can be separated into its individual components by conventional methods, such as fractional crystallization and the like, and the individual compounds so obtained can be employed in the process of the invention. Alternatively, and preferably, the mixture of mono- and die-acid phosphates obtained in the above reaction can be employed as such, without separation, into its components, in the process of the invention or can be converted to the corresponding mixture of pyrophosphates using the procedures discussed hereinbefore, which latter mixture is then employed in the process of the invention.

Illustrative of the acid phosphates of the formula (I) above which can be employed individually or in combination with other acid phosphates in the process of the invention are: mono-O-octyl, mono-O-nonyl, mono-O-decyl, mono-O-undecyl, mono-O-dodecyl, mono-O-tridecyl, mono-O-tetradecyl, mono-O-pentadecyl, mono-O-hexadecyl, mono-O-heptadecyl, mono-O-octadecyl, mono-O-nonadecyl, mono-O-eicosyl mono-O-heneicosyl, mono-O-docosyl, mono-O-tricosyl, mono-O-pentacosyl, mono-O-hexacosyl, mono-O-heptacosyl, mono-O-octacosyl, mono-O-nonacosyl, mono-O-triacontyl, mono-O-pentatriacontyl, mono-O-dodecenyl, mono-O-tridecenyl, mono-O-tetradecenyl, mono-O-pentadecenyl, mono-O-hexadecenyl, mono-O-heptadecenyl, mono-O-octadecenyl, mono-O-nonadecenyl, mono-O-eicosenyl, mono-O-heneicosenyl, mono-O-docosenyl, mono-O-tricosenyl, mono-O-pentacosenyl, mono-O-triacontenyl and mono-O-pentatriaconsenyl di-acid phosphates and thiophosphates and the diacid phosphates and thiophosphates in which the esterifying radical is that derived from a monohydric alcohol which has been capped using the appropriate molar proportions of ethylene oxide, propylene oxide, epichlorohydrin or 1,1,1-trichlorobutylene oxide.

Illustrative of the acid phosphates of the formula (II) above which can be employed individually or in combination with other acid phosphates in the process of the invention are: O,O-di(octyl), O,O-di(nonyl), O,O-di(decyl), O,O-di(undecyl), O,O-di(dodecyl), O,O-di(tridecyl), O,O-di(tetradecyl), O,O-di(pentadecyl), O,O-di(hexadecyl), O,O-di(heptadecyl), O,O -di(octadecyl), O,O-di(nonadecyl), O,O-di(eicosyl), O,O-di(heneicosyl), O,O-di(docosyl), O,O-di(tricosyl), O,O-di(pentacosyl), O,O-di(hexacosyl), O,O-di(heptacosyl), O,O-di(octacosyl), O,O-(nonacosyl), O,O-di(triacontyl), O,O-di(pentatriacontyl), O,O-di(dodecenyl), O,O-di(tridecenyl), O,O-di(tetradecenyl), O,O-di(pentadecenyl), O,O-de(hexadecenyl), O,O-di(heptadecenyl), O,O-di(octadecenyl), O,O-di(nonadecenyl), O,O-di(eicosenyl), O,O-di(heneicosenyl), O,O-di(docosenyl), O,O-di(tricosenyl), O,O-di(pentacosenyl), O,O-di(triacontenyl), and O,O -di(pentatriacosenyl) mono acid phosphates and thiophosphates, and the diesterified mono acid phosphates or thiophosphates in which the esterifying radical is that derived from a monohydric alcohol which has been capped with the appropriate molar proportion of ethylene oxide, propylene oxide, epichlorohydrin or 1,1,1-trichlorobutylene oxide. Illustrative of the latter types of phosphate which are available, in admixture with the corresponding diacid phosphates, are the materials marketed under the trade name Tryfac by Emery Industries Inc.

Illustrative of the pyrophosphates of the formula (III) above which can be employed individually or in combination with other pyrophosphates in the process of the invention are: tetraoctyl, tetranonyl, tetradecyl, tetraundecyl, tetradodecyl, tetra(tridecyl), tetra(tetradecyl), tetra(pentadecyl), tetra(hexadecyl), tetra(heptadecyl), tetra(octadecyl), tetra(nonadecyl), tetra(eicosyl), tetra(heneicosyl), tetra(docosyl), tetra(tricosyl), tetra(pentacosyl), tetra(hexacosyl), tetra(heptacosyl), tetra(octacosyl), tetra(nonacosyl), tetra(triacontyl), tetra(pentatriacontyl), tetra(dodecenyl), tetra(tridecenyl), tetra(tetradecentyl), tetra(pentadecenyl), tetra(hexadecenyl), tetra(heptadecenyl), tetra(octadecenyl), tetra(nonadecenyl), tetra(eicosenyl), tetra(heneicosenyl), tetra(docosenyl), tetra(tricosenyl), tetra(pentacosenyl), tetra(triacontenyl), and tetra(pentatriacosenyl)pyrophosphates and the corresponding thio analogues.

Illustrative of the pyrophosphates of the formula (IV) above which can be employed individually or in combination with other pyrophosphates in the process of the invention are di(octyl), di(nonyl), di(decyl), di(undecyl), di(dodecyl), di(tridecyl), di(tetradecyl), di(pentadecyl), di(hexadecyl), di(heptadecyl), di(octadecyl), di(nonadecyl), di(eicosyl), di(heneicosyl), di(docosyl), di(tricosyl), di(pentacosyl), di(hexacosyl), di(heptacosyl), di(octacosyl), di(nonacosyl), di(triacontyl), di(pentatriacontyl), di(dodecenyl), di(tridecenyl), di(tetradecenyl), di(pentadecenyl), di(hexadecenyl), di(heptadecenyl), di(octadecenyl), di(nonadecenyl), di(eicosenyl), di(heneicosenyl), di(docosenyl), di(tricosenyl), di(pentacosenyl), di(triacontenyl) and di(pentatriacosenyl)pyrophosphates and the corresponding thio analogues.

The O-monoacyl derivatives of the acid phosphates (I) and (II), which can be employed in the process of the invention and which are shown as formulae (V) and (VI) above, are readily prepared by procedures well-known in the art. Illustratively, the corresponding acid phosphate (I) or (II) in the form of its silver or other metal salt, is reacted with the appropriate acyl halide $R_1COHal$ where Hal represents chlorine or bromine and $R_1$ is as hereinbefore defined, using the procedures described by Kosolapoff, ibid, p. 334. Illustrative of the O-monoacyl derivatives of the acid phosphates (I) and (II) are the O-acetyl, O-propionyl, O-octanyl, O-decanoyl, O-dodecanoyl, O-benzoyl, O-toluoyl, O-phenacetyl derivatives of the various acid phosphates (I) and (II) exemplified above.

The carbamoyl phosphates having the formula (VII) which are employed in the process of the invention are readily prepared by reaction of the appropriate acid phosphate (I) or (II) with the appropriate hydrocarbyl mono- or polyisocyanate using, for example, the procedure described by F. Cramer and M. Winter, Chem. Ber. 92, 2761 (1959). Illustrative of such carbamoyl phosphates are the methylcarbamoyl, ethylcarbamoyl, propylcarbamoyl, hexylcarbamoyl, decylcarbamoyl, dodecylcarbamoyl, allylcarbamoyl, hexenylcarbamoyl, octenylcarbamoyl, decenylcarbamoyl, dodecenylcarbamoyl, phenylcarbamoyl, tolylcarbamoyl, diphenylcarbamoyl, benzylcarbamoyl, phenylpropylcarbamoyl, 4,4'-methylenebis(phenyl carbamoyl), and like hydrocarbamoyl derivatives of the monoacid phosphates (stabilized in the form of their ammonium or alkali metal salts) as exemplified above. The carbamoyl phosphates (VII) may contain free OH groups due to incomplete conversion of the acid phosphates in the reaction with the appropriate hydrocarbyl mono or polyisocyanate because of low order of reactivity of the OH groups in question with the isocyanate. Such compounds containing said free OH groups can be used in the process of the invention without producing undesirable side-effects because of the low order of reactivity of the OH groups with isocyanate.

The polyphosphates corresponding to the formula (X), which are employed in the process of the invention, are readily prepared by reaction of the appropriate trialkylphosphate $(RX)_3PX$, wherein R and X are as hereinbefore defined, with phosphorus pentoxide or phosphorus oxysulfide using the procedures described by Kosolapoff, ibid, p. 341. The polyphosphates are generally complex mixtures whose composition is represented generically by the formula (X), and include cyclic compounds (n=3) having a six-membered ring composed of alternate phosphorus and oxygen atoms.

The polyphosphates corresponding to the formula (VIII) and (IX), which are employed in the process of the invention, are readily prepared by the reaction of the appropriate di$_x$or trialkylphosphate and the appropriate halophosphate

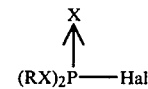

where R and X are as hereinbefore defined and Hal is chlorine or bromine, using, for example, the procedure described by Kosolapoff, ibid, p. 338. The procedure involves elimination of alkyl halide.

In a further embodiment of the invention it is found that the combination of polyisocyanate and phosphate release agent employed as binder in the process of the invention can be used in conjunction with thermosetting resin binders hitherto employed in the art such as phenol-formaldehyde, resorcinol-formaldehyde, melamine-formaldehyde, urea-formaldehyde, urea-furfural and condensed furfuryl alcohol series. Not only does the use of such a combination avoid the problems of adhesion of the finished particle boards to the platens of the press, which problems were previously encountered with a blend of isocyanate and the above type of thermosetting resin binder, but the physical properties of the particle boards so obtained are markedly improved by the use of the combination.

The following preparations and examples describe the manner and process of making and using the invention and set forth the best mode contemplated by the inventors of carrying out the invention but are not to be construed as limiting.

Preparation 1

Preparation of pyrophosphate from lauryl acid phosphate

A mixture of 70 g. lauryl acid phosphate (a mixture of O,O-dilauryl monoacid phosphate and O-lauryl di-acid phosphate; Hooker Chemical Company) and 60 g. of phenyl isocyanate was charged to a dry flask fitted with stirrer, condenser and drying tube, the flask was immersed in an oil bath preheated to 80° C. and the contents of the flask were stirred while the temperature of the oil bath was slowly raised to 115° C. Carbon dioxide was evolved over a period of about 1 hours. When evolution of carbon dioxide had ceased, the reaction mixture was cooled to room temperature and diluted with 100 ml. of chloroform. The resulting mixture was filtered and the solid so collected (24.8 g. of N,N'-diphenylurea) was washed with chloroform. The combined filtrate and washings were concentrated on a rotary evaporator at a bath temperature of 50° C. When most of the solvent had been evaporated, crystals of N,N',N''-triphenylbiuret separated and the evaporation was interrupted to filter off this solid material (6.6 g.). The filtrate was evaporated to dryness and subjected finally to reduced pressure at 50° C. to remove excess phenyl isocyanate. The residue (70 g.) was the desired pyrophosphate in the form of a colorless to pale yellow liquid. The infrared spectrum of the product (in CHCl$_3$) did not show any bands characteristic of P-OH bonds but had a strong band at 940 cm$^{-1}$ characteristic of P-O-P bonds.

Preparation 2

Preparation of pyrophosphate from lauryl acid phosphate

A total of 70 g. of lauryl acid phosphate (same starting material as used in Preparation 1) was charged to a flask fitted with stirrer, reflux condenser and gas inlet and was heated under nitrogen at 65°-75° C. until molten. The melt was stirred while a slow stream of phosgene was passed in for a total of 2.5 hours. The temperature was maintained in the above range throughout the addition. Evolution of gas from the reaction mixture was vigorous in the first hour of the phosgene addition but gradually subsided and was very slow at the end of the period of addition of phosgene. After the addition was complete, the mixture was purged with nitrogen for 15 hours while maintaining the temperature in the above range. At the end off this time the pressure in the reaction flask was gradually reduced to about 1.0 mm. of mercury to remove gaseous hydrogen chloride and carbon dioxide. The viscous residue so obtained solidified completely on allowing to stand overnight. There was thus obtained 66 g. of pyrophosphate as a solid which melts gradually at about 60° C.

Preparation 3

Preparation of pyrophosphate from oleyl acid phosphate

A mixture of 200 g. of oleyl acid phosphate (comprised of a mixture of O,O-dioleyl acid phosphate and O-monooleyl acid phosphate as supplied by Hooker Chemical Company) was reacted with 160 g. of phenyl isocyanate at a temperature of 85°-90° C. for 5.5 hours using the procedure described in Preparation 1. The N,N'-diphenylurea (68 g.) was removed by filtration after the reaction mixture had been diluted with 200 ml. of chloroform. The filtrate was concentrated on a rotary evaporator and the excess unreacted phenyl isocyanate was removed by distillation at reduced pressure. N,N',N''-triphenylbiuret crystallized from the oily residue on standing at room temperature. Removal of the crystals by filtration yielded 196 g. of a liquid product, the infrared spectrum of which exhibited a band at 940 cm$^{-1}$ characteristic of P—O—P bands but showed no bands characteristic of the P—OH band.

Preparation 4

Preparation of pyrophosphate from lauryl acid phosphate

A solution of 30.4 parts by weight of lauryl acid phosphate (same starting material as in Preparation 1) in 21 parts by weight of toluene was charged to a dry reactor previously purged with nitrogen. The solution was heated to 40° C. with agitation at which point a solution of 7.6 parts by weight of polymethylene polyphenyl polyisocyanate [eq. wt.=133; functionality 2.8; containing circa 50 percent methylenebis(phenyl isocyanate)] in 5 parts by weight of toluene was added. The resulting mixture was stirred while a stream of phosgene was introduced (ca. 0.1 parts by weight per minute) and the temperature was slowly raised to 80° C. The temperature was maintained at this level, with continuous introduction of phosgene until a total of 20 parts by weight of the latter had been introduced. The total time of phosgene addition was 5 hr. 50 mins. The reaction mixture was heated at the same temperature for a further 40 minutes after phosgene addition was complete before being heated to 90° to 95° C. and purged with nitrogen for 2 hours to remove excess phosgene. The pressure in the reactor was then reduced until refluxing of toluene commenced and the purging with nitrogen was continued for a further 2 hr. The toluene was then removed by distillation under reduced pressure, the last traces being removed in vacuo. The residue was cooled to room temperature, treated with diatomaceous earth (Celite 545) and filtered after agitating for 30 minutes. There was thus obtained 23.7 parts by weight of a mixture of lauryl pyrophosphate and polymethylene polyphenyl polyisocyanate which was found to contain 6.08% w/w of phosphorus.

Preparation 5

Further preparation of pyrophosphate from lauryl acid phosphate

Using the procedure described in Preparation 4 but replacing the polymethylene polyphenyl polyisocyanate there used by an equivalent amount (6.8 parts by weight) of phenyl isocyanate there was obtained a further batch of lauryl pyrophosphate.

Preparation 6

A series of acid phosphates (mixtures of mono- and di-acid phosphates) was prepared by reaction of the corresponding alcohol with phosphorous pentoxide using the following standard procedure which is illustrated for the preparation of the mixture of the corresponding mono- and di-(hexyloxyethyleneoxyethyl)-phosphate by reaction of hexyl carbitol (hexyl ether of diethylene glycol) with phosphorus pentoxide.

A total of 9.97 g. (0.07 mole) of phosphorus pentoxide was charged, under nitrogen and in the absence of moisture, to 50 g. of freshly distilled methylene chloride. To the resulting mixture was added, with rapid stirring, a total of 41.4 g. (0.218 mole) of hexyl carbitol at such a rate as to maintain a steady rate of reflux of solvent. When the addition was complete, the solvent was permitted to distil slowly from the reaction mixture while the pot temperature was not permitted to rise above about 80° C. The last traces of solvent were removed in vacuo on a rotary film evaporator for 15–30 minutes at 85°–90° C. There was thus obtained a mixture of the mono- and di-(hexyloxyethyleneoxyethyl) acid phosphates.

Using the above procedure but replacing the hexyl carbitol there used by an equivalent amount of the following alcohols:
propyloxypropanol
butyloxypropanol
phenoxypropanol
phenoxyethanol
nonylphenoxyethanol
butyl carbitol
tridecylphenoxyethyleneoxyethanol

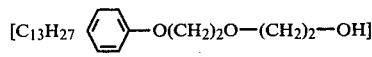

butyl ether of tri(ethylene glycol) $[C_4H_9O(CH_2)_2O(CH_2)_2O(CH_2)_2OH]$
tridecyl ether of nona(ethylene glycol) $[C_{13}H_{27}O(CH_2CH_2O)_9H]$
methyl ether of dodeca(ethylene glycol) $[CH_3O(CH_2CH_2O)_{12}H]$
dodecyl ether of dodeca(ethylene glycol) $[C_{12}H_{25}O(CH_2CH_2O)_{12}H]$
methyl ether of heptadeca(ethylene glycol) $[CH_3O(CH_2CH_2O)_{17}H]$
phenol
mixture of methanol and dodecanol
n-propanol
n-butanol
heptanol and tridecyl alcohol; there were obtained the corresponding mixtures of the mono- and di-acid phosphates.

All the above acid phosphates were employed as release agents in combination with a polyisocyanate binder in the preparation of particle boards in accordance with the invention.

EXAMPLE 1

A series of samples of wood particle board was prepared using the following procedure from the components and quantities of components (all parts by weight) shown in Table 1 below.

The wood chips ("Turner shavings") were placed in a rotating blender drum and the drum was rotated while the particles were sprayed with an aqueous emulsion of the polyisocyanate, water, phosphate and emulsifying agent. The emulsion was prepared by blending the components thereof using a Turrex mixer. The resulting emulsion was sprayed with a paint spray gun on to the wood particles while tumbling for 45–120 seconds to achieve homogeneity. The coated particles were formed into a felted mat on a 12"×12" cold-rolled steel plate with the aid of a plywood forming frame. After removal of the forming frame, steel bars having a thickness corresponding to the desired thickness (¼") of the final particle board were placed along two opposing edges of the aforesaid steel plate and a second 12"×12" cold-rolled steel plate was placed on top of the mat. The complete assembly was then placed on the lower platen of a Dake press having a capacity of 100,000 lbs. of force. Both platens of the press were preheated to a selected temperature shown in Table 1 below. Pressure was then applied and the time of molding shown in Table 1 was calculated from the point at which the pressure exerted on the mat reached 500 psi. At the expiry of the molding time shown in Table 1 the pressure was released and the particle board was demolded. In all instances it was found that demolding was accomplished readily with no tendency of the board to stick to the places with which it was in contact. This is in direct contrast to the behaviour of a board prepared under identical conditions but without the presence of the lauryl acid phosphate in the emulsion used as binder in preparing the board.

The various samples of particle board so prepared were then subjected to a series of physical tests and the properties so determined are recorded in Table 1. These properties demonstrate the excellent structural strength properties of the boards.

TABLE 1

| | Board | | | |
|---|---|---|---|---|
| | A | B | C | D |
| Materials used | | | | |
| Wood chips | 644 | 644 | 644 | 644 |
| Wt. of water in chips | 56 | 56 | 56 | 56 |
| Polyisocyanate[1] | 19.2 | 19.2 | 19.2 | 19.2 |
| Water in emulsion | 51 | 51 | 51 | 51 |
| Lauryl acid phosphate[2] | 1.9 | 1.9 | 1.9 | 1.9 |
| Emulsifying agent[3] | 0.1 | 0.1 | 0.1 | 0.1 |
| % w/w polyisocyanate* | 3.0 | 3.0 | 3.0 | 3.0 |
| % w/w water* | 17 | 17 | 17 | 17 |
| % w/w phosphate* | 0.3 | 0.3 | 0.3 | 0.3 |
| % w/w emulsifier* | 0.016 | 0.016 | 0.016 | 0.016 |
| Platen temp. °F. | 340 | 340 | 340 | 340 |
| Mold time, minutes | 1.5 | 2.0 | 2.5 | 3.0 |
| Physical Properties | | | | |
| Density, pcf | 40 | 41 | 41 | 40 |
| Modulus of rupture:[4] | | | | |
| psi | 3710 | 3600 | 4300 | 4470 |
| Modulus of elasticity:[4] | | | | |
| psi × 10³ | 502 | 472 | 540 | 543 |
| Dry internal bond: psi[4] | 102 | 104 | 112 | 90 |
| Wet internal bond: psi[4] | 23 | 24 | 24 | 23 |

Footnotes to TABLE 1
[1]Polymethylene polyphenyl polyisocyanate: eq. wt. = 133; functionality 2.8; containing circa 50 percent methylenebis(phenyl isocyanate).
[2]Mixture of lauryl diacid phosphate and dilauryl mono acid phosphate: Hooker Chemical Company.
[3]Ethoxylated propoxylated butanol: Witconol APEB: Witco Chemical Company.
[4]Tests carried out in accordance with ASTM-1037-72.
[5]Tests carried out in accordance with German V-100 specifications.
*Calculated on dry weight of wood particles.

EXAMPLE 2

A series of samples of wood particle board was prepared using the procedure described in Example 1 using the various components and quantities (all parts by weight) shown in Table 2 below. The mold time shown in the Table for samples E and F is the time for which the mat was maintained under pressure (500 psi) after the internal temperature of the mat (as determined by a thermocouple inserted therein) had reached 130° F. Sample G was a control sample molded as described in Example 1. The physical properties determined for each of the finished particle boards are also shown in Table 2 and demonstrate the excellent structural strength of the various samples. All of the samples demolded readily and showed no sigh of adhering to the steel plates used in their preparation.

TABLE 2

| | Board | | |
|---|---|---|---|
| | E | F | G |
| Materials used | | | |
| Wood chips | 644 | 644 | 644 |
| Wt. of water in chips | 56 | 56 | 56 |
| Polyisocyanate (same as Ex. 1) | 21 | 42 | 21 |
| Water in emulsion | 56 | 56 | 56 |
| Lauryl pyrophosphate[1] | 2.1 | 4.2 | 2.1 |
| Emulsifying agent (same as Ex. 1) | 0.1 | 0.1 | 0.1 |
| % w/w polyisocyanate* | 3.3 | 6.6 | 3.3 |
| % w/w water* | 17.4 | 17.4 | 17.4 |
| % w/w pyrophosphate* | 0.33 | 0.65 | 0.33 |
| % w/w emulsifier* | 0.016 | 0.016 | 0.016 |
| Platen temp. °F. | 355 | 355 | 355 |
| Mold time, minutes | 2 | 2 | 2 |
| Physical Properties | | | |
| Density: pcf | 41 | 41 | 42 |
| Modulus of rupture: psi[2] | 5130 | 5090 | 5320 |
| Modulus of elasticity:[2] psi × 10$^3$ | 505 | 513 | 521 |
| Dry internal bond: psi[2] | 128 | 141 | 132 |
| Wet internal bond: psi[3] | 32 | 38 | 31 |

Footnotes to TABLE 2
[1]Prepared as described in Preparation 1.
[2]Tests carried out in accordance with ASTM 1037-72.
[3]Tests carried out in accordance with German V-100 specifications.
*Calculated on dry weight of wood particles.

EXAMPLE 3

A series of samples of wood particle board was prepared using exactly the same reactants and proportions shown in Example 1 and using exactly the procedure described in that Example, save that the platens of the press were preheated to 400° F. and maintained thereat for the various molding times shown in Table 3 below.

The physical properties of the samples so prepared are also recorded in Table 3 and show that these samples all possessed excellent structural strength. None of the samples showed any tendency to adhere to the molding plates during demolding.

TABLE 3

| | Board | | | | |
|---|---|---|---|---|---|
| | H | I | J | K | L |
| Mold time, minutes | 1.0 | 1.5 | 2.0 | 2.5 | 3.0 |
| Physical Properties | | | | | |
| Density: pcf | 40 | 40 | 41 | 40 | 40 |
| [1]Modulus of rupture: psi | 2760 | 3530 | 3150 | 3210 | 3370 |
| [1]Modulus of elasticity: psi × 10$^3$ | 409 | 472 | 441 | 438 | 454 |
| [1]Dry internal bond: psi | 94 | 102 | 88 | 107 | 107 |
| [2]Wet internal bond: psi | 23 | 24 | 23 | 25 | 24 |

Footnotes to TABLE 3
[1]Tests carried out in accordance with ASTM 1037-72.
[2]Tests carried out in accordance with German V-100 specifications.

EXAMPLE 4

A series of samples of wood particle board was prepared using the procedure described in Example 1 but varying the nature of the polyisocyanate and employing, in place of the lauryl acid phosphate, the pyrophosphate derived from oleyl acid phosphate prepared as described in Preparation 3. The various components and the proportions thereof (all parts by weight) are shown in Table 4 below together with the physical properties determined on the finished samples. The thickness of the board samples in all cases was ⅜ inch (spacer bars of appropriate thickness were used). None of the samples showed any tendency to stick to the molding plates during demolding. The physical properties of the various samples show that they all have excellent structural strength.

TABLE 4

| | Board | | | | | | | | |
|---|---|---|---|---|---|---|---|---|---|
| | M | N | O | P | Q | R | S | T | U |
| Materials | | | | | | | | | |
| Wood chips | 644 | 644 | 644 | 644 | 644 | 644 | 644 | 644 | 644 |
| Wt. of water in chips | 56 | 56 | 56 | 56 | 56 | 56 | 56 | 56 | 56 |
| Polyisocyanate | | | | | | | | | |
| A[1] | 21 | | | | | | | | |
| B[2] | | 21 | | | | | | | |
| C[3] | | | 21 | | | | | | |
| D[4] | | | | 21 | | | | | |
| E[5] | | | | | 21 | | | | |
| F[6] | | | | | | 21 | | | |
| G[7] | | | | | | | 21 | | |
| H[8] | | | | | | | | 21 | |
| I[9] | | | | | | | | | 21 |
| Water in emulsion | 47 | 47 | 47 | 47 | 47 | 47 | 47 | 47 | 47 |
| Pyrophosphate | 2.1 | 2.1 | 2.1 | 2.1 | 2.1 | 2.1 | 2.1 | 2.1 | 2.1 |
| Emulsifying agent (same as Ex. 1) | 0.1 | 0.1 | 0.1 | 0.1 | 0.1 | 0.1 | 0.1 | 0.1 | 0.1 |
| % w/w isocyanate* | 3.3 | 3.3 | 3.3 | 3.3 | 3.3 | 3.3 | 3.3 | 3.3 | 3.3 |
| % w/w water* | 16 | 16 | 16 | 16 | 16 | 16 | 16 | 16 | 16 |
| % w/w pyrophosphate* | 0.33 | 0.33 | 0.33 | 0.33 | 0.33 | 0.33 | 0.33 | 0.33 | 0.33 |
| % w/w emulsifier* | 0.016 | 0.016 | 0.016 | 0.016 | 0.016 | 0.016 | 0.016 | 0.016 | 0.016 |
| Platen temp. °F. | 340 | 340 | 340 | 340 | 340 | 340 | 340 | 340 | 340 |
| Mold time, minutes | 4 | 4 | 4 | 4 | 4 | 4 | 4 | 4 | 4 |
| Physical Properties | | | | | | | | | |
| Density, pcf | 41 | 40 | 42 | 41 | 41 | 42 | 40 | 41 | 40 |
| Modulus of rupture, psi[10] | 4030 | 5100 | 5470 | 4410 | 5380 | 6240 | 5940 | 6160 | 2960 |
| [10]Modulus of elasticity psi × 10$^3$ | 465 | 542 | 554 | 432 | 493 | 528 | 583 | 602 | 496 |
| Dry internal bond, psi[10] | 76 | 126 | 136 | 83 | 83 | 94 | 168 | 165 | 47 |

TABLE 4-continued

| | Board | | | | | | | | |
|---|---|---|---|---|---|---|---|---|---|
| | M | N | O | P | Q | R | S | T | U |
| Wet internal bond, psi[11] | 18 | 27 | 32 | 21 | 21 | 22 | 36 | 33 | 16 |

Footnotes to TABLE 4
[1] Liquid prepolymer of methylenebis(phenyl isocyanate): Eq. wt. = 181
[2] Polymethylene polyphenyl polyisocyanate containing circa 65 percent methylenebis(phenyl isocyanate): eq. wt. = 133
[3] Polymethylene polyphenyl polyisocyanate containing circa 45 percent methylenebis(phenyl isocyanate): eq. wt. = 133.5
[4] Liquid methylenebis(phenyl isocyanate) prepared in accordance with U.S. 3,384,653: eq. wt. = 143
[5] Polymethylene polyphenyl polyisocyanate containing circa 35 percent methylenebis(phenyl isocyanate): eq. wt. 140
[6] Polymethylene polyphenyl polyisocyanate containing circa 35 percent methylenebis(phenyl isocyanate): eq. wt. 140
[7] Polymethylene polyphenyl polyisocyanate containing circa 70 percent methylenebis(phenyl isocyanate): eq. wt. = 133
[8] Same as Example 1
[9] Toluene diisocyanate
[10] Tests carried out in accordance with ASTM 1037-72
[11] Tests carried out in accordance with German V-100 specifications
*Based on oven dry wood

EXAMPLE 5

This example illustrates the preparation of particle board in accordance with the invention using a binder composition in which no extraneous emulsifying agent is present and the polyisocyanate was applied neat, i.e. not in the form of an aqueous emulsion.

A series of samples of wood particle board was prepared using the various componenrts and quantities (all parts by weight) shown in Table 5 below and using the procedure described in Example 1 with the exception that the wood particles were first sprayed with the stated amount of water and thereafter were sprayed with a mixture of the polyisocyanate and the phosphate release agent. The physical properties determined for each of the finished particle boards are also shown in Table 5 and demonstrate the excellent structural strength of the various samples. All of the samples demolded readily and showed no sign of adhering to the steel plates used in their preparation.

TABLE 5

| | Board | | | | |
|---|---|---|---|---|---|
| | W | X | Y | Z | ZZ |
| Materials | | | | | |
| Wood chips | 644 | 644 | 644 | 644 | 644 |
| Wt. water in chips | 56 | 56 | 56 | 56 | 56 |
| Polyisocyanate | 38.6 | 38.6 | 38.6 | 38.6 | 38.6 |
| Water | 56 | 56 | 56 | 56 | 56 |
| Lauryl pyrophosphate (same as Ex. 2) | 3.9 | 3.9 | 3.9 | 3.9 | 3.9 |
| % w/w polyisocyanate* | 6 | 6 | 6 | 6 | 6 |
| % w/w water total* | 17.4 | 17.4 | 17.4 | 17.4 | 17.4 |
| % w/w pyrophosphate* | 0.6 | 0.6 | 0.6 | 0.6 | 0.6 |
| Mold time (minutes) | 2 | 2.5 | 3.0 | 2 | 2.5 |
| Board thickness (inches) | ⅜ | ⅜ | ⅜ | ½ | ½ |
| Physical properties | | | | | |
| Density pcf | 42 | 41 | 42 | 40 | 41 |
| Modulus of rupture:[1] psi | 5320 | 5186 | 5787 | 4325 | 4810 |
| Modulus of elasticity:[1] psi × 10³ | 501 | 510 | 564 | 377 | 365 |
| Dry internal bond: psi[1] | 135 | 133 | 141 | 183 | 178 |
| Wet internal bond: psi[2] | 43 | 42 | 46 | 50 | 49 |

Footnotes to TABLE 5
*Calculated on dry weight of wood particles
[1] Tests carried out in accordance with ASTM 1037-72
[2] Tests carried out in accordance with German V-100 specifications

EXAMPLE 6

This example illustrates the preparation of three particle boards in accordance with the process of the invention from "wafer" chips having varying dimensions as large as 2"×2"×1/32" and supplied by Weldwood of Canada, Ltd. No extraneous water or emulsifying agent was used and the polyisocyanate and phosphate release agent were applied neat.

A series of samples of particle board from the wafer chips was prepared using the various components and quantities (all parts by weight) shown in Table 6 below and using the procedure described in Example 1 with the exception that the wood wafers were sprayed with a mixture of the polyisocyanate and the phosphate release agent and not with an aqueous emulsion as in Example 1 and that aluminum molding plates were used. All of the samples demolded readily and showed no sign of adhering to the aluminum plates used in their preparation. The excellent structural strength properties of the resulting particle boards, as evidenced by the high modulus of rupture shown in Table 6, compare very favorably with the low value of this parameter (2500 psi) determined in a board available commercially and prepared from the same type of wafer chips using a phenol-formaldehyde resin binder.

TABLE 6

| | Board | | |
|---|---|---|---|
| | AA | BB | CC |
| Wafer chips | 955 | 955 | 955 |
| Wt. water in chips | 45 | 45 | 45 |
| Polyisocyanate[1] | 19.1 | 50 | 50 |
| Lauryl pyrophosphate (same as Ex. 2) | 2.5 | 6.5 | 6.5 |
| % w/w polyisocyanate* | 2 | 5.2 | 5.2 |
| % w/w total water* | 4.7 | 4.7 | 4.7 |
| % w/w pyrophosphate* | 0.26 | 0.68 | 0.68 |
| Mold time (mins.) | 4.5 | 4 | 4.5 |
| Board thickness (in.) | ½ | ½ | ½ |
| Density, pcf | 46 | 43 | 45 |
| Modulus of rupture: psi | 7317 | 7946 | 10,860 |

*calcd. on dry weight of wood wafers
[1] Polymethylene polyphenyl polyisocyanate: eq. wt. = 139: functionality 3.0. Viscosity at 25° C. = 700 cps: containing circa 35 percent methylenebis(phenyl isocyanate).

EXAMPLE 7

This example illustrates the preparation of a series of particle boards using polyisocyanate binders in combination with various commercially available phosphates in amounts corresponding to approximately 0.7 percent w/w phosphorus in the binder resin combination.

The various samples were prepared using the various components and quantities (all parts by weight) shown in Table 7 and using the procedure described in Example 1 with the exception that no emulsifying agent was employed, and the water was sprayed onto the chips first, followed by the isocyanate mixed with the release agent. All of the samples demolded readily and showed no sign of adhering to the steel plates used in their preparation. In contrast, a control board, prepared in exactly the same manner but omitting the use of a phosphate release agent, adhered to the steel plates used in the preparation and could not be demolded without damage to the surface of the board.

parts by weight) are shown in Table 8 below together with the physical properties determined on certain of the samples. All the samples could be demolded without damage to the board or significant adhesion to the mold plates. The samples prepared using the higher concentrations of phosphate release agent slid out from be-

TABLE 7

|  | Board | | | | | | | |
|---|---|---|---|---|---|---|---|---|
|  | DD | EE | FF | GG | HH | II | JJ | KK |
| Woodchips (same as Ex. 1) | 1440 | 1440 | 1440 | 1440 | 1440 | 1440 | 1440 | 1440 |
| Wt. Water in Chips | 60 | 60 | 60 | 60 | 60 | 60 | 60 | 60 |
| Polyisocyanate (same as Ex. 1) | 86.4 | 86.4 | 86.4 | 86.4 | 86.4 | 86.4 | 86.4 | 86.4 |
| Added water | 120 | 120 | 120 | 120 | 120 | 120 | 120 | 120 |
| Tridecyl acid phosphate | 8.33 | | | | | | | |
| Fosterge A2523[1] | | 11.66 | | | | | | |
| Tryfac 5573[2] | | | 8.64 | | | | | |
| Tryfac 325A[3] | | | | 12.96 | | | | |
| Tryfac 610A[4] | | | | | 17.28 | | | |
| Fosterge R[5] | | | | | | 5.75 | | |
| Tryfac 525A[6] | | | | | | | 16.4 | |
| Lauryl pyrophosphate[7] | | | | | | | | 8.6 |
| % w/w polyisocyanate* | 6 | 6 | 6 | 6 | 6 | 6 | 6 | 6 |
| % w/w total water* | 12 | 12 | 12 | 12 | 12 | 12 | 12 | 12 |
| Mold time (min.) | 4 | 4 | 4 | 4 | 4 | 4 | 4 | 4 |
| Board thickness, inch | ½ | ½ | ½ | ½ | ½ | ½ | ½ | ½ |

Footnotes to TABLE 7
[1]Alkyl acid phosphate derived from lauryl alcohol prereacted with 3 molar proportions of ethylene oxide; Textilana Division of Henkel Inc., Hawthorne, California.
[2]Lauryl acid phosphate; Emery Industries Inc., Mauldin, South Carolina.
[3]Alkyl acid phosphate derived from ethoxylated lauryl alcohol; Emery Industries Inc.
[4]Alkyl acid phosphate derived from ethoxylated mid-chain branched aliphatic alcohol; Emery Industries, Inc.
[5]Alkyl acid phosphate derived from n-octyl alcohol; Textilana, ibid.
[6]Alkyl acid phosphate derived from ethoxylated lauryl alcohol; Emery Industries Inc.
[7]Prepared as described in Preparation 5.
*Calcd. on dry weight of wood wafers.

EXAMPLE 8

A further series of particle board samples was prepared using the same phosphate release agents and procedure employed in Example 7 but at lower levels of concentration in the binder resin combination. The various components and the proportions thereof (all tween the mold plates when demolded whereas some of those prepared using the lower concentrations of phosphate release agent (OO, QQ, and UU) required assistance, e.e. tapping of the mold plates, in order to effect release. All the samples had a thickness of ½" in the final board.

TABLE 8

|  | Board | | | | | | | | | | | |
|---|---|---|---|---|---|---|---|---|---|---|---|---|
|  | LL | MM | NN | OO | PP | QQ | RR | SS | TT | UU | VV | WW |
| Materials used | | | | | | | | | | | | |
| Wood chips | 920 | 920 | 920 | 920 | 920 | 920 | 920 | 920 | 920 | 920 | 920 | 920 |
| Wt. water in chips | 80 | 80 | 80 | 80 | 80 | 80 | 80 | 80 | 80 | 80 | 80 | 80 |
| Polyisocyanate (same as Ex. 1) | 46 | 46 | 46 | 46 | 46 | 46 | 46 | 46 | 46 | 46 | 46 | 46 |
| Added water | 58 | 58 | 58 | 58 | 58 | 58 | 58 | 58 | 58 | 58 | 58 | 58 |
| Tryfac 525A (Ex. 7) | — | — | — | — | 4.83 | 2.3 | — | — | — | — | — | — |
| Fosterge R (Ex. 7) | — | — | 1.6 | 0.78 | — | — | — | — | — | — | — | — |
| Fosterge A2523 (Ex. 7) | 3.36 | 1.62 | — | — | — | — | — | — | — | — | — | — |
| Tryfac 610A (Ex. 7) | — | — | — | — | — | — | — | — | — | — | 5.11 | 2.42 |
| Tridecyl monoacid phosphate (Ex. 7) | — | — | — | — | — | — | — | — | 2.33 | 1.136 | — | — |
| Tryfac 325A (Ex. 7) | — | — | — | — | — | — | 3.67 | 1.77 | — | — | — | — |
| % P in binder[1] | 0.4 | 0.2 | 0.4 | 0.2 | 0.4 | 0.2 | 0.4 | 0.2 | 0.4 | 0.2 | 0.4 | 0.2 |
| Mold time (mins.) | 4 | 4 | 4 | 4 | 4 | 4 | 4 | 4 | 4 | 4 | 4 | 4 |
| Physical Properties | | | | | | | | | | | | |
| Density: pcf | 43.4 | N.T. | 46.0 | N.T. | 45.9 | N.T. | 43.6 | N.T. | 46.2 | N.T. | 44.6 | N.T. |
| Modulus of rupture: psi[2] | 6500 | N.T. | 5920 | N.T. | 6350 | N.T. | 6040 | N.T. | 6220 | N.T. | 6580 | N.T. |
| Modulus of elasticity: psi × $10^3$ [2] | 434 | N.T. | 413 | N.T. | 417 | N.T. | 417 | N.T. | 426 | N.T. | 430 | N.T. |
| Dry internal | | | | | | | | | | | | |

TABLE 8-continued

| | Board | | | | | | | | | | | |
|---|---|---|---|---|---|---|---|---|---|---|---|---|
| | LL | MM | NN | OO | PP | QQ | RR | SS | TT | UU | VV | WW |
| bond: psi | 189 | N.T. | 207 | N.T. | 194 | N.T. | 166 | N.T. | 213 | N.T. | 179 | N.T. |

Footnotes to TABLE 8
[1] Percent P in combination of polyisocyanate and phosphate.
[2] Tests carried out in accordance with ASTM 1037-72.
N.T. = material not tested.

EXAMPLE 9

This example illustrates the use of a binder resin combination in accordance with the invention in association with a phenol-formaldehyde resin binder of the prior art.

All of the samples ($\frac{1}{2}$" thickness) were prepared using the procedure described in Example 1, with the exceptions detailed below, and using the reactants and proportions (all parts by weight) set forth in Table 9. In the case of Boards YY and ZZ the phenolformaldehyde resin was incorporated in the emulsion of the isocyanate whereas, in the case of Board AAA, the chips were sprayed firstly with the indicated amount of added water, then with the phenol-formaldehyde resin and finally with the polyisocyanate. In the case of control board BBB the chips were sprayed with water and then with phenol-formaldehyde resin. The Boards XX and ZZ showed no significant adhesion to the mold plates after molding whereas serious adhesion problems were encountered in the case of Boards YY, AAA, and BBB. The physical properties of the various boards are also shown in Table 9, from which it will be seen that the properties of Boards XX and ZZ, both within the scope of this invention, are clearly superior to those of boards YY, AAA and BBB all of which are outside the scope of the invention.

TABLE 9

| | Boards | | | | |
|---|---|---|---|---|---|
| | XX | YY | ZZ | AAA | BBB |
| Materials | | | | | |
| Wood chips | 1920 | 1920 | 1920 | 1920 | 1920 |
| Wt. water in chips | 80 | 80 | 80 | 80 | 80 |
| Phenol-formaldehyde resin | — | 96 | 96 | 96 | 192 |
| Polyisocyanate (same as Ex. 1)[1] | 96 | 48 | 48 | 48 | — |
| Added water | 208 | 160 | 160 | 160 | 112 |
| Emulsifying agent[2] | 2.4 | 2.4 | 2.4 | — | — |
| Lauryl pyrophosphate[3] | 9.6 | — | 4.8 | — | — |
| % w/w resin* | 5 | 5 | 5 | 5 | 5 |
| % w/w water* | 15 | 15 | 15 | 15 | 15 |
| % w/w phosphate* | 0.5 | — | 0.25 | — | — |
| Platen temp. °F. | 350 | 350 | 350 | 350 | 350 |
| Mold time (minutes) | 5.5 | 5.5 | 5.5 | 5.5 | 5.5 |
| Physical Properties | | | | | |
| Density pcf | 41.7 | 42.8 | 44.6 | 44.5 | 41.4 |
| Modulus of Rupture: psi[4] | 3650 | 3000 | 3320 | 3250 | 2770 |
| Modulus of elasticity: psi × 10³ [4] | 310 | 300 | 355 | 319 | 301 |
| Dry internal bond: psi[4] | 170 | 158 | 152 | 168 | 100 |
| Wet internal bond: psi[5] | 78 | 64 | 61 | 50 | 22 |

[1] PB-65: Borden; aqueous suspension, 50% solids.
[2] Aqueous solution: sodium salt of styrene-maleic anhydride copolymer: 30% solids: Monsanto.
[3] Prepared as described in Preparation 4.
[4] Tests carried out in accordance with ASTM-1037-72.
[5] Test carried out in accordance with German V-100 specifications.
*Calcd. on dry weight of wood particles.

EXAMPLE 10

A series of samples of wood particle board was prepared using a combination of a polymethylene polyphenyl polyisocyanate and an acid phosphate as the binder. The polyisocyanate used in all cases was a polymethylene polyphenyl polyisocyanate containing approximately 48 percent by weight of methylenebis(phenyl isocyanate) and having an isocyanate equivalent of 134.5 and a viscosity at 25° of 173 cps. A different acid phosphate was used in each instance but all the acid phosphates were mixtures of di-acid phosphates of formula

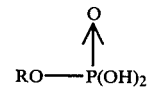

and mono-acid phosphates

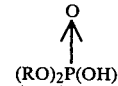

where R had the value shown in Table 10 below, said mixture of said phosphates having been prepared as described in Preparation 6 above unless otherwise stated.

The method of preparation of the particle board sample in all instances was as follows:

A batch of 2500 g. of Douglas fir wood chips was sprayed with 112 g. of the polyisocyanate using the procedure and apparatus described in Example 1. When the spraying and tumbling with polyisocyanate was complete, the treated chips were then sprayed using the same procedure and apparatus with an amount of the mixture of acid phosphates such that the total amount of phosphorus present in the combination of acid phosphate and polyisocyanate was approximately 1 percent by weight. The exact amount of the acid phosphate used in each instance is recorded in Table 10 below. The mixture of acid phosphates was diluted with 40-50 g. of Freon R11 (trichlorofluoromethane) or water (diluent indicated in each case in Table 10) to facilitate spraying. An aliquot (2156 g.) of the treated chips was then utilized to prepare a particle board having a thickness of $\frac{3}{8}$" using the procedure described in Example 1 but using cold-rolled steel plates having a dimension of 24"×36" and a forming frame with inside dimensions of 18.5"×30". A sheet of aluminum foil was inserted between each steel plate and the abutting surface of the particle board mat. The platen temperature was 350° F., and the press time was 2.5 minutes at about 500 psi minimum, in all cases. After the particle board, with aluminum sheets in contact therewith, was removed from the platens of the press, the relative ease with which the aluminum foil separated from the particle board was rated as "excellent" (no resistance to removal), "good" (no resistance to peeling of foil) or "fair" (some resistance but could be peeled off without tearing or other damage to the foil). It was apparent that all the acid phosphates used gave significant release properties. The data relating to the samples is shown in Table 10.

the aluminum foil were rated on the basis set forth in Example 10. The results are recorded in Table 11.

TABLE 10

| R in acid phosphate | % w/w P in binder[1] | % w/w acid phosphate in binder[1] | Diluent for phosphate | Ease of release |
|---|---|---|---|---|
| $C_3H_7O-C_3H_6-$ | 1.1 | 8.6 | Freon | Good |
| $C_4H_9O-C_3H_6-$ | 1.0 | 8.7 | Freon | Excellent |
| $C_6H_5O-C_3H_6-$ | 1.0 | 9.7 | Freon | Fair |
| [2]$C_4H_9O-CH_2CH_2-$ | 1.0 | 12.4 | Water | Good |
| nonylphenyl$-O-CH_2CH_2-$ | 0.9 | 14.4 | Freon | Excellent |
| $C_4H_9-(OCH_2CH_2)_{\overline{2}}-$ | 1.0 | 10.2 | Freon | Excellent |
| $C_6H_{13}-(OCH_2CH_2)_{\overline{2}}-$ | 1.0 | 11.9 | Freon | Excellent |
| tridecylphenyl$-(OCH_2CH_2)_{\overline{2}}-$ | 0.8 | 16.8 | Freon | Excellent |
| $C_4H_9-(OCH_2CH_2)_{\overline{3}}-$ | 1.0 | 12.1 | Freon | Excellent |
| *[3]di(nonyl)phenyl$-(OCH_2CH_2)_{\overline{3}}-$ | 0.8 | 28.9 | Freon | Excellent |
| *$C_{13}H_{27}-(OCH_2CH_2)_{\overline{9}}-$ | 0.8 | 25.1 | Freon | Excellent |
| *[4]nonylphenyl$-(OCH_2CH_2)_{\overline{9}}-$ | 0.8 | 30.1 | Freon | Excellent |
| *$CH_3-(OCH_2CH_2)_{\overline{12}}-$ | 1.2 | 24.3 | Freon | Excellent |
| *$C_{12}H_{25}-(OCH_2CH_2)_{\overline{12}}-$ | 0.8 | 29.4 | Freon | Excellent |
| *$CH_3-(OCH_2CH_2)_{\overline{17}}-$ | 1.2 | 30.0 | Freon | Excellent |
| $C_{12}H_{25}(OCH_2CH_2)_{\overline{23}}-$ | 0.7 | 42.2 | Freon | Fair |
| $C_4H_9-$ | 1.0 | 6.2 | Freon | Fair |
| $C_6H_5-$ | 1.5 | 10 | Freon | Fair |
| Mixture of $CH_3-$ and $C_{12}H_{25}-$ | 0.9 | 7.1 | Freon | Excellent |
| nonylphenyl | 0.6 | 7.4 | Freon | Excellent |

Footnotes to TABLE 10:
[1]binder = polyisocyanate + acid phosphate
[2]As diethylamine salt: Virco Pet 30: Mobil Corporation
[3]Tryfac 5555: Emery Industries
[4]Tryfac 5556: Emery Industries
*Each of these acid phosphates in admixture with the isocyanate formed a good emulsion when shaken with water.

EXAMPLE 11

Using the procedure described in Example 10, but replacing the mixture of acid phosphates by bis-2-ethylhexylpyrophosphoric acid (Mobil Corporation) and by dibutylpyrophosphoric acid (Mobil Corporation) in amounts representing 12% by weight based on total weight of pyrophosphoric acid and polyisocyanate there were obtained particle boards with ease of release rated as "excellent" for the former and "fair" for the latter.

EXAMPLE 12

A further series of wood particle boards was prepared using exactly the same procedure as that described in Example 10 with the sole exception that the mixture of acid phosphates was blended with the polyisocyanate and the blend was diluted with 40–50 g. of Freon R11 before being sprayed on to the wood chips. The polyisocyanate employed throughout the series was the same as that employed in Example 10. A different acid phosphate was used in each instance but all the acid phosphates were mixtures of di-acid phosphates of formula

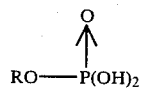

and mono-acid phosphates

where R had the value shown in Table 11 below, said mixture of acid phosphates having been prepared as described in Preparation 6 above unless otherwise stated. The ease of release of the particle boards from

TABLE 11

| R in acid phosphate | % w/w P in binder[1] | % w/w acid phosphate in binder[1] | Ease of release |
|---|---|---|---|
| *[2]$C_{12}H_{25}(OCH_2CH_2)_{\overline{3}}-$ | 0.6 | 9.7 | Excellent |
| *[3]$C_{12}H_{25}(OCH_2CH_2)_{\overline{3}}-$ | 0.6 | 10.6 | Excellent |
| *[4]$C_{12}H_{25}(OCH_2CH_2)_{\overline{5}}-$ | 0.6 | 13.6 | Excellent |
| *[5]$C_{13}H_{27}(OCH_2CH_2)_{\overline{6}}-$ | 0.6 | 14.3 | Excellent |
| $C_3H_7-$ | 1.0 | 5.0 | Fair |
| $C_4H_9-$ | 1.7 | 10.0 | Excellent |
| $C_7H_{15}-$ | 1.3 | 10.0 | Excellent |
| $C_8H_{17}-$ | 0.5 | 4.6 | Excellent |
| [6]2-ethylhexyl- | 1.2 | 10 | Good |
| [7]tridecyl | 0.8 | 10 | Excellent |

Footnotes to TABLE 11
*Each of these acid phosphates in admixture with the isocyanate formed an emulsion on shaking with water.
[1]binder = polyisocyanate + acid phosphate
[2]Fosterge A2523: Textilana
[3]Tryfac 325A: Emery Industries
[4]Tryfac 525A: Emery Industries
[5]Trytac 610A: Emery Industries
[6]Mobil Corporation
[7]Mobil Corporation As noted in the above Example and in Example 10, a number of the acid phosphates there used possess "self-emulsifying" properties, i.e. form emulsions when shaken or otherwise agitated with water in the absence of an additional surfactant. This finding is particularly advantageous where the polyisocyanate binder containing the acid phosphate release agent is employed in the form of an aqueous emulsion, since, in the case of the above acid phosphates there is no need to employ an additional emulsifying agent—the acid phosphate serves both as release agent and emulsifying agent. It has been found that such "self-emulsifying" properties are found in the case of those acid phosphates of the formula (I) and (II) wherein R represents

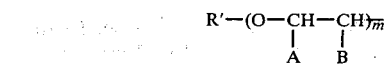

wherein R', A and B have the significance hereinbefore defined and m has an average value from 3 to 30.

We claim:

1. In a process for the preparation of particle board wherein particles of organic material capable of being compacted are contacted with a polyisocyanate composition and the treated particles are subsequently formed into boards by the application of heat and pressure, the improvement which comprises contacting said particles, in addition to the treatment with said polyisocyanate composition, with from about 0.1 to about 20 parts, per 100 parts by weight of said polyisocyanate, of a phosphate selected from the class consisting of (a) acid phosphates of the formulae

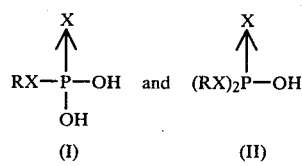

and the ammonium, alkali metal, alkaline earth metal and amine salts thereof;

(b) pyrophosphates represented by those derived from the acid phosphates (I) and (II) and mixtures of (I) and (II);

(c) The O-monoacyl derivatives of the acid phosphates (I) and (II) having the formulae

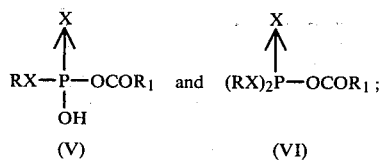

(d) carbamoyl phosphates having the formula

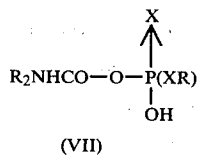

and the ammonium, alkali metal, alkaline earth metal and amine salts of the compounds of formula (VII);

(e) branched polyphosphates of the formulae

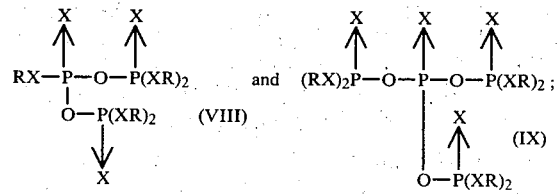

(f) polyphosphates corresponding to the general formula

including the cyclometaphosphates (n=3); and (g) mixtures of two or more of said compounds;

wherein, in the various formulae shown above, each R is independently selected from the class consisting of alkyl having at least 3 carbon atoms, alkenyl having at least 3 carbon atoms, aryl, aryl substituted by at least one alkyl, alkyl substituted by from 1 to 2 acyloxy groups wherein the acyl group is the residue of an aliphatic monocarboxylic acid having at least 2 carbon atoms, and

wherein R' is selected from the class consisting of alkyl, aryl and aryl substituted by at least one alkyl, one of A and B represents hydrogen and the other is selected from the class consisting of hydrogen, methyl, chloromethyl and 2,2,2-trichloroethyl, and m is a number having an average value from 1 to 25; provided that when one of the R's in Formulae (II), (VI), (VIII) an (IX) is alkyl having at least 3 carbon atoms, the other R can also be selected from methyl and ethyl; and further provided that, in Formula (II), the two RX groups taken together with the P atom to which they are attached can additionally form the residue of a heterocyclic nucleus having from 5 to 6 ring atoms; $R_1$ is hydrocarbyl; $R_2$ is selected from the class consisting of hydrocarbyl and hydrocarbyl substituted by at least one additional

group wherein R has the significance defined above; n is an integer; and X in each instance is a chalcogen selected from oxygen and sulfur.

2. The process of claim 1 wherein said polyisocyanate is a polymethylene polyphenyl polyisocyanate containing from about 25 to about 90 percent by weight of methylenebis (phenyl isocyanate), the remainder of said mixture being oligomeric polymethylene polyphenyl polyisocyanates of functionality greater than 2.

3. The process of claim 2 wherein the polymethylene polyphenyl polyisocyanate contains from about 35 to about 65 percent by weight of methylenebis (phenyl isocyanate).

4. The process of claim 1 wherein said phosphate comprises a mixture of lauryl diacid phosphate and dilauryl monoacid phosphate.

5. The process of claim 1 wherein said phosphate comprises a pyrophosphate derived by removal of water of condensation from a mixture of lauryl diacid phophate and dilauryl monoacid phosphate.

6. The process of claim 1 wherein said phosphate comprises a mixture of oleyl diacid phosphate and diolyl monoacid phosphate.

7. The process of claim 1 wherein said phosphate comprises a pyrophosphate derived by removal of water of condensation from a mixture of oleyl diacid phosphate and dioleyl monoacid phosphate.

8. The process of claim 1 wherein the particles employed in the preparation of said particle board are wood chips.

9. The process of claim 1 wherein said polyisocyanate and said phosphate are applied simultaneously to said particles in the form of an aqueous emulsion.

10. The process of claim 9 wherein said aqueous emulsion of polyisocyanate also comprises an emulsifying agent.

11. The process of claim 1 wherein said particles are contacted separately with said polyisocyanate and said phosphate.

12. The process of claim 11 wherein said polyisocyanate and said phosphate are each employed in the form of an aqueous dispersion.

13. The process of claim 11 wherein said particles are contacted with water prior to being contacted with said polyisocyanate and said phosphate.

14. In a process for the preparation of particle board wherein particles of cellulosic material are contacted with an aqueous emulsion of a polyisocyanate and the treated particles are subsequently formed into boards by the application of heat and pressure, the improvement which comprises employing an aqueous emulsion containing (a) from about 10 parts by weight to about 99 parts by weight, per 100 parts by weight of emulsion, of a polymethylene polyphenyl polyisocyanate containing from about 25 to about 90 percent by weight of methylenebis (phenyl isocyanate), the remainder of said mixture being oligomeric polymethylene polyphenyl polyisocyanates of functionality greater than 2; and (b) from about 0.1 parts by weight to about 20 parts by weight, per 100 parts by weight of polyisocyanate, of a phosphate selected from the class consisting of (i) acid phosphates of the formulae:

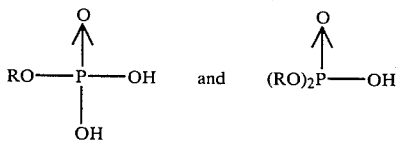

and the ammonium, alkali metal, and alkaline earth metal salts thereof, wherein each R is independently selected from the class consisting of alkyl having at least 3 carbon atoms, alkenyl having at least 3 carbon atoms, aryl, aryl substituted by at least one alkyl, alkyl substituted by from 1 to 2 acyloxy groups wherein the acyl group is the residue of an aliphatic monocarboxylic acid having at least 2 carbon atoms, and

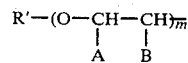

wherein R' is selected from the class consisting of alkyl, aryl and aryl substituted by at least one alkyl, one of A and B represents hydrogen and the other is selected from the class consisting of hydrogen, methyl, chloromethyl and 2,2,2-trichloroethyl, and m is a number having an average value from 1 to 25; provided that, when one of the R groups in the formula

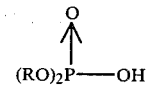

is alkyl having at least 3 carbon atoms, the other R can also be selected from methyl and ethyl and further provided that the two RO groups in said formula, taken together with the P atom to which they are attached, can additionally form the residue of a heterocyclic nucleus having from 5 to 6 ring atoms;

(ii) the corresponding pyrophosphates derived from said acid phosphates including mixtures of two or more such phosphates by the removal of water of condensation; and (iii) mixtures of at least one of said acid phosphates and at least one of said pyrophosphates.

15. The process of claim 14 wherein said polymethylene polyphenyl polyisocyanate contains from about 35 to about 65 percent by weight of methylenebis(phenyl isocyanate).

16. The process of claim 14 wherein said phosphate comprises a mixture of lauryl diacid phosphate and dilauryl monoacid phosphate.

17. The process of claim 14 wherein said phosphate comprises a pyrophosphate derived by removal of water of condensation from a mixture of lauryl diacid phosphate and dilauryl monoacid phosphate.

18. The process of claim 14 wherein said phosphate comprises a mixture of oleyl diacid phosphate and dioleyl monoacid phosphate.

19. The process of claim 14 wherein said phosphate comprises a pyrophosphate derived by removal of water of condensation from a mixture of oleyl diacid phosphate and dioleyl monoacid phosphate.

20. The process of claim 14 wherein said phosphate comprises a member selected from the class consisting of butyl diacid phosphate, dibutyl monoacid phosphate, mixtures thereof, and the pyrophosphates derived by removal of water of condensation from said mono- and di-acid phosphates and mixtures thereof.

21. The process of claim 14 wherein said phosphate comprises a member selected from the class consisting of heptyl diacid phosphate, diheptyl monoacid phosphate, mixtures thereof, and the pyrophosphates derived by removal of water of condensation from said mono- and di-acid phosphates and mixtures thereof.

22. The process of claim 14 wherein said phosphate comprises a member selected from the class consisting of octyl diacid phosphate, dioctyl monoacid phosphate, mixtures thereof, and the pyrophosphates derived by removal of water of condensation from said mono- and di-acid phosphates and mixtures thereof.

23. The process of claim 14 wherein said phosphate comprises a self-emulsifying phosphate selected from the class consisting of acid phosphates of the following formulae, mixtures thereof, and the pyrophosphates derived by removal of water of condensation from said acid phosphates and mixtures thereof:

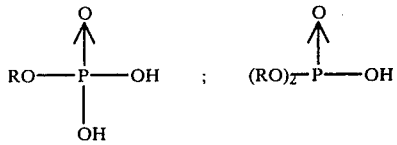

wherein R represents

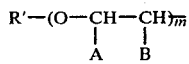

where R', A and B have the significance defined in claim 14 and m is a number having an average value from 3 to 30.

24. The process of claim 14 wherein said aqueous emulsion also comprises an emulsifying agent.

25. The process of claim 14 wherein said emulsion also comprises a phenol-formaldehyde resin.

26. In a process for the preparation of particle board wherein particles of cellulosic material are contacted with a polyisocyanate and the treated particles are subsequently formed into boards by the application of heat and pressure, the improvement which comprises contacting said particles, in addition to the treatment with said polyisocyanate, with from about 0.1 to about 20 parts, per 100 parts by weight of said polyisocyanate, of a phosphate selected from the class consisting of:

(i) acid phosphates of the formulae:

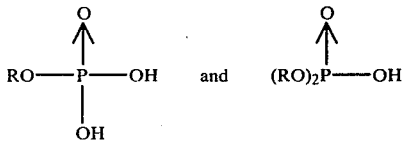

and the ammonium, alkali metal, alkaline earth metal and amine salts thereof, wherein each R is independently selected from the class consisting of alkyl having at least 3 carbon atoms, alkenyl having at least 3 carbon atoms, aryl, aryl substituted by at least one alkyl, alkyl substituted by from 1 to 2 acyloxy groups wherein the acyl group is the residue of an aliphatic monocarboxylic acid having at least 2 carbon atoms, and

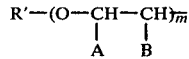

wherein R' is selected from the class consisting of alkyl, aryl and aryl substituted by at least one alkyl, one of A and B represents hydrogen and the other is selected from the class consisting of hydrogen, methyl, chloromethyl and 2,2,2-trichloromethyl, and m is a number having an average value from 1 to 25; provided that, when one of the R groups of the formula

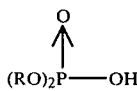

is alkyl having at least 3 carbon atoms, the other R can also be selected from methyl and ethyl, and further provided that the two RO groups in said formula, taken together with the P atom to which they are attached, can additionally form the residue of a heterocyclic nucleus having from 5 to 6 ring atoms;

(ii) the corresponding pyrophosphates derived from said acid phosphates including mixtures of two or more such phosphates by the removal of water of condensation; and (iii) mixtures of at least one of said acid phosphates and at least one of said pyrophosphates.

27. The process of claim 26 wherein said polyisocyanate and said phosphate are applied sequentially to said particles.

28. The process of claim 26 wherein said particles are first contacted with water and then with a preformed mixture of said polyisocyanate and said phosphate.

29. The process of claim 26 wherein said particles are additionally contacted with a phenol-formaldehyde resin.

30. The process of claim 26 wherein said phosphate comprises a member selected from the class consisting of lauryl diacid phosphate, dilauryl monoacid phosphate, mixtures thereof, and the pyrophosphates derived by removal of water of condensation from said mono- and di-acid phosphates and mixtures thereof.

31. The process of claim 26 wherein said phosphate comprises a member selected from the class consisting of oleyl diacid phosphate, dioleyl monoacid phosphate, mixtures thereof, and the pyrophosphates derived by removal of water of condensation from said mono- and di-acid phosphates and mixtures thereof.

32. The process of claim 26 wherein said phosphate comprises a member selected from the class consisting of butyl diacid phosphate, dibutyl monoacid phosphate, mixtures thereof, and the pyrophosphates derived by removal of water of condensation from said mono- and di-acid phosphates and mixtures thereof.

33. The process of claim 26 wherein said phosphate comprises a member selected from the class consisting of heptyl diacid phosphate, diheptyl monoacid phosphate, mixtures thereof, and the pyrophosphates derived by removal of water of condensation from said mono- and di-acid phosphates and mixtures thereof.

34. The process of claim 26 wherein said phosphate comprises a member selected from the class consisting of octyl diacid phosphate, dioctyl monoacid phosphate, mixtures thereof, and the pyrophosphates derived by removal of water of condensation from said mono- and di-acid phosphates and mixtures thereof.

35. The process of claim 26 wherein said phosphate comprises a self-emulsifying phosphate selected from the class consisting of acid phosphates of the following formulae, mixtures thereof, and the pyrophosphates derived by removal of water of condensation from said acid phosphates and mixtures thereof:

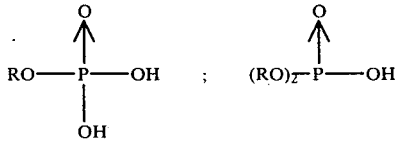

wherein R represents

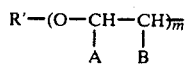

where R', A and B have the significance defined in claim 26 and m is a number having an average value from 3 to 30.

36. The process of claim 35 wherein said self-emulsifying phosphate is employed in the form of an aqueous emulsion.

37. A storage stable composition comprising a mixture of:

(a) a polymethylene polyphenol polyisocyanate containing from about 25 to about 90 percent by weight of methylenebis(phenyl isocyanate) the remainder of said mixture being oligomeric polymethylene polyphenol polyisocyanates having a functionality higher than 2.0; and (b) from about 0.1 parts by weight to about 20 parts by weight, per 100 parts by weight of said polyisocyanate, of a pyrophosphate derived by removal of water of condensation from at least one acid phosphate selected from acid phosphates of the formulae:

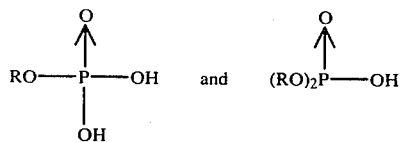

wherein each R is independently selected from the class consisting of alkyl having at least 3 carbon atoms, alkeyl having at least 3 carbon atoms, aryl, aryl substituted by at least one alkyl, alkyl substituted by from 1 to 2 acyloxy groups wherein the acyl group is the residue of an aliphatic monocarboxylic acid having at least 2 carbon atoms, and

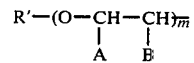

wherein R' is selected from the class consisting of alkyl, aryl and aryl substituted by at least one alkyl, one of A and B represents hydrogen and the other is selected from the class consisting of hydrogen, methyl, chloromethyl and 2,2,2-trichloroethyl, and m is a number having an average value from 1 to 25, and mixtures of two or more of said acid phosphates; provided that, when one of the R groups in the formula

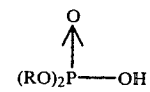

is alkyl having at least 3 carbon atoms, the other R can also be selected from methyl and ethyl, and further provided that the two RO groups in said formula, taken together with the P atom to which they are attached, can additionally form the residue of a heterocyclic nucleus having from 5 to 6 ring atoms.

38. A composition according to claim 37 wherein the pyrophosphate is derived from a mixture of lauryl diacid phosphate and dilauryl monoacid phosphate.

39. A composition according to claim 37 wherein the pyrophosphate is derived from a mixture of oleyl diacid phosphate and dioleyl monoacid phosphate.

40. A composition according to claim 37 wherein the pyrophosphate is derived from a mixture of butyl diacid phosphate and dibutyl acid phosphate.

41. A composition according to claim 37 wherein the pyrophosphate is derived from a mixture of heptyl diacid phosphate and diheptyl acid phosphate.

42. A composition according to claim 37 wherein the pyrophosphate is derived from a mixture of octyl diacid phosphate and dioctyl acid phosphate.

43. A composition according to claim 37 which also comprises an emulsifying agent.

* * * * *

UNITED STATES PATENT OFFICE
CERTIFICATE OF CORRECTION

Patent No. 4,257,995          Dated March 24, 1981

Inventor(s) Alexander McLaughlin, Reinhard H. Richter and Harold E. Reymore

It is certified that error appears in the above-identified patent and that said Letters Patent are hereby corrected as shown below:

In column 4, lines 5-13, the formula should appear as follows:

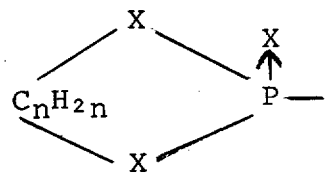

The first two words at column 6, line 33 should read --of being--. Column 8, line 15: "or" should read --of--. Column 10, line 27: "die-acid" should read --di-acid--. Column 10, line 68: "O,O-(nonacosyl)" should read --O,O-di(nonacosyl)--. Column 11, line 3: "O,O-de(hexadecenyl)" should read --O,O-di(hexadecenyl)--. Column 11, line 62: "O-octanyl" should read --O-octanoyl--. Column 12, line 39: "di$_x$or" should read --di or--. Column 16, line 45: "Wet internal bond:psi$^4$" should read --$^5$Wet internal bond:psi--. Column 17, line 1: "sigh" should read --sign--. Column 19, line 42: --(same as Ex. 1)-- should be inserted after "Polyisocyanate". Column 21, Table 8 under "Physical Properties": "Modulus of rupture" should read --$^2$Modulus of rupture--. Column 23, line 43: "Phenol-" should read --$^1$Phenol- --. Column 23, line 45: "Ex.1)$^1$"should read --Ex. 1)--. Column 24, line 15: "25°" should read --25°C--. Column 24, line 32: "said"

UNITED STATES PATENT OFFICE
CERTIFICATE OF CORRECTION

Patent No. 4,257,995          Dated March 24, 1981

Inventor(s) Alexander McLaughlin, Reinhard H. Richter and Harold E. Reymore

It is certified that error appears in the above-identified patent and that said Letters Patent are hereby corrected as shown below:

should read --acid--. Column 25, Table 10 (15th line): "*$CH_3$-($OCH_2CH_2$)$_{\overline{17}}$" should read --*$CH_3$-($OCH_2CH_2$)$_{\overline{17}}$--. Column 28, line 28: "an" should read --and--. Column 33, lines 16 and 20: "polyphenol" should read --polyphenyl--, each occurrence. Column 33, line 40: "alkeyl" should read --alkenyl--.

Signed and Sealed this

Twenty-first Day of July 1981

[SEAL]

Attest:

GERALD J. MOSSINGHOFF

Attesting Officer    Commissioner of Patents and Trademarks